United States Patent [19]

Baker

[11] Patent Number: 4,826,331

[45] Date of Patent: May 2, 1989

[54] PROTECTIVE BEARINGS GUARD

[76] Inventor: Herbert R. Baker, 2334 S. 63rd St., West Allis, Wis. 53219

[21] Appl. No.: 168,860

[22] Filed: Mar. 16, 1988

[51] Int. Cl.$^4$ ............................................. F16C 33/74
[52] U.S. Cl. ..................................... 384/145; 384/488
[58] Field of Search ............... 384/145, 488, 209, 417, 384/498, 208

[56] References Cited

U.S. PATENT DOCUMENTS

| | | | |
|---|---|---|---|
| 558,262 | 4/1896 | Darling | 384/209 |
| 1,806,748 | 5/1931 | Edwards | 384/488 |
| 2,733,648 | 2/1956 | Todd | 384/498 |

OTHER PUBLICATIONS

Fafnir brochure entitled "Flush Mounted Flange Units" (no date).

Primary Examiner—Lenard A. Footland
Attorney, Agent, or Firm—Andrus, Sceales, Starke & Sawall

[57] ABSTRACT

A bearing guard is adapted for use in connection with a machine such as a chipping/shredding/grinding machine for lawn and garden use. The bearing guard is used in connection with self-aligning bearings which support the ends of a rotatable shaft provided on the machine and which is exposed to a work cavity in which the chipping, shredding or grinding operations take place. The bearing guard protects the bearings from material which is retained on the rotatable shaft during operation of the machine. The bearing guard comprises a shield surface disposed between the work cavity of the machine and the side of the bearing facing the work cavity. The shield surface has an opening through which the rotatable shaft of the machine passes. The opening is in relatively close dimensional tolerance with respect to the outer surface of the shaft, so as to resist contact of material retained on the shaft with the side of bearing during operation of the machine. The shield surface may be disposed on a separate plate structure which is connected to the housing of the machine along with the housing of the bearing, or it may be formed integrally with one of the housing members of the bearing.

3 Claims, 2 Drawing Sheets

4,826,331

PROTECTIVE BEARINGS GUARD

BACKGROUND AND SUMMARY

This invention relates to a self-aligning bearing or the like, and more particularly to a guard for protecting such a bearing and for prolonging its life.

Self-aligning bearings or the like are used in many applications. One such application is as a support for the ends of a rotatable shaft used in connection with a chipping/shredding/grinding machine for lawn and garden use. Such a machine typically has a rotatable shaft disposed in the lower portion of a housing, to which a hammer assembly is mounted. One bearing assembly is connected to each side of the lower portion of the housing, for supporting the ends of the shaft. The shaft and hammer assembly are rotated by means of a motor and drive assembly which imparts rotation to the shaft. Such rotation of the shaft causes rotation of the hammer assembly which chips, shreds and/or grinds material fed into the lower portion of the housing of the machine.

With the above-described construction, one side of each self-aligning bearing faces toward the interior of the housing of the machine, where the chipping, shredding or grinding operation takes place. With this type of machine, it is common for rope, twine, vines or other such thin, flexible material to wrap around the shaft. An accumulation of such material on the shaft can cause substantial outward pressure on the side of the self-aligning bearing facing the interior of the housing. Such pressure on the side of a self-aligning bearing forces lubricant from the bearing, which leads to premature failure of the bearing.

It is an object of the invention to provide a structure which resists or prevents contact of material within a work cavity such as the interior of the housing of a chipping/shredding/grinding machine, with the inner side of the bearing which supports the shaft adjacent the housing. In accordance with the invention, a protective guard for a self-aligning bearing or the like comprises shield means disposed between the work cavity and the side of the bearing facing the work cavity. The shield means has an opening adapted to accommodate passage of the shaft therethrough, and the opening is relatively closely dimensioned to the outer surface of the shaft so as to resist material within the work cavity from contacting the side of the bearing facing the work cavity. In one embodiment, the bearing includes a housing having a projecting lip for retaining the components of the bearing, and the shield means extends inwardly beyond the projecting lip toward the shaft. The shield means may comprise a cover member adapted to fit over the projecting lip of the housing and having a shielding surface extending inwardly therefrom toward the shaft. The shield means may alternatively comprise a shielding surface formed integrally with the projecting lip of the bearing housing and extending inwardly therefrom toward the shaft.

A bearing assembly is also provided, generally in accordance with the above features of the invention.

BRIEF DESCRIPTION OF THE DRAWINGS

The drawings illustrate the best mode presently contemplated of carrying out the invention.

In the drawings

DETAILED DESCRIPTION OF THE PREFERRED EMBODIMENT

Figure 1:
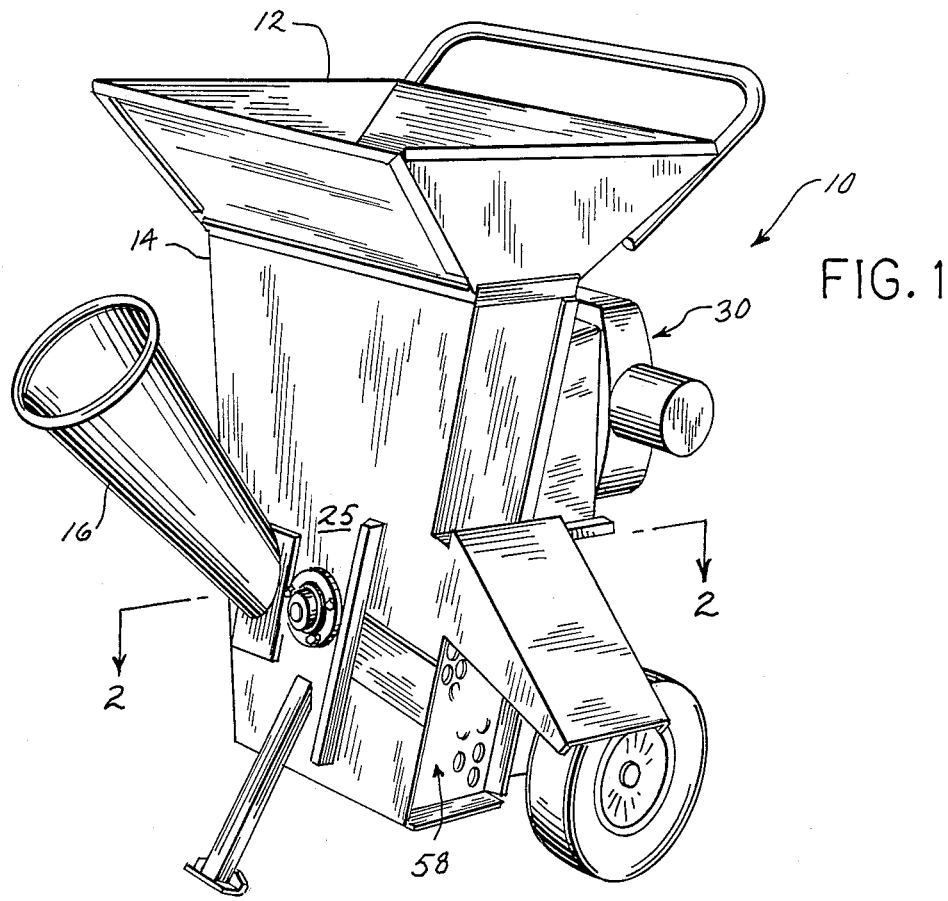
FIG. 1 is an isometric view of a chipping/shredding/grinding machine having a housing with a rotatable shaft disposed in the lower end thereof.

With reference to FIG. 1, a chipping/shredding/grinding machine is shown generally at 10. Chipping/shredding/grinding machine 10 may be constructed generally as shown in my copending patent application Ser. No. 07/124,039 filed Nov. 23, 1987, incorporated herein by reference. However, it is to be understood that the subject matter of the present invention is not limited to use in connection with a machine as therein described.

Chipping/shredding/grinding machine 10 includes a hopper 12 connected to the upper end of a housing 14. A chute 16 is connected to the side of housing 14. Hopper 12 is adapted to receive leaves or other loose, bulky materials to be shredded and ground, while chute 16 is adapted to receive branches or like objects to be chipped.

Figure 2:
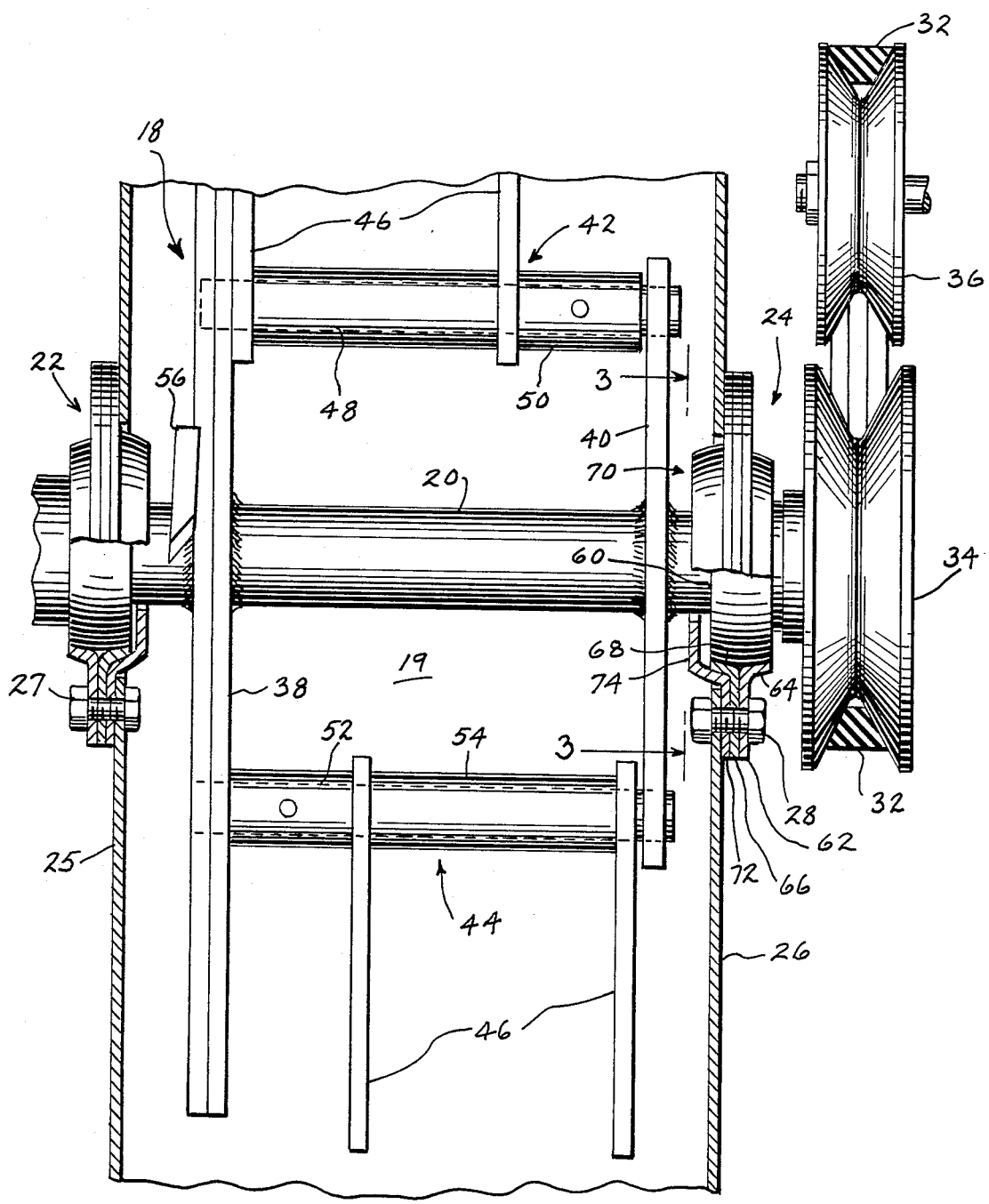
FIG. 2 is a partial sectional view taken generally along line 2—2 of FIG. 1.

With reference to FIG. 2, a hammer assembly 18 is provided in a work cavity 19 in lower end of the interior of housing 14. Hammer assembly 18 is mounted to a shaft 20, which extends through the interior of the lower portion of housing 14. Shaft 20 is supported at its ends by means of a pair of self-aligning bearing assemblies, shown at 22, 24, which are connected to side walls 25, 26 of work cavity 19 by means of bolts 27, 28, respectively, or the like. Self-aligning bearings 22, 24 may be those such as manufactured by Fafnir Bearing Division of Textron, Inc. under its RA designation, or any other such satisfactory bearing. As is known, bearings 22, 24 support and accommodate rotation of the ends of shaft 20.

Shaft 20 is rotated by means of a motor 30 (FIG. 1) which is provided with a motor sheave around which a belt 32 is trained. As shown in FIG. 2, a drive sheave 34 is connected to an end of shaft 20 extending from housing 14, and receives belt 32. An idler sheave 36 is disposed between the motor sheave and drive sheave 34, to induce tension in belt 32 as it is driven by motor 30.

With the described construction, shaft 20 is rotatably driven by motor 30. Rotation of shaft 20 causes rotation of hammer assembly 18, which includes a pair of end plates 38, 40 mounted to shaft 20. A plurality of pivot bars, such as 42, 44 are connected between end plates 38, 40, and carry a plurality of staggered hammers, shown at 46. Hammers 46 are maintained in position by means of a plurality of sleeve-like spacer members 48, 50, 52 and 54. As described in the above-noted patent application Ser. No. 07/124,039, rotation of hammer assembly 18 causes hammers 46 to pivot about pivot bars 42, 44 and to shred and/or grind material contained within the lower end of housing 14.

A knife member, shown at 56, is mounted to end plate 38 and rotates along with hammer assembly 18. Knife 56 is provided adjacent the opening of chute 16 into work cavity 19, so as to chip branches or the like as they are fed therein. A discharge 58 (FIG. 1) is provided in a side of the lower portion of housing 14 to discharge material from work cavity 19 which has been chipped, shredded or ground by knife 56 and hammer assembly 18.

During operation of machine 10, it is common for slender, flexible objects, such as rope, twine or vines, to be fed into the interior of housing 14. It is not unusual for such materials to wrap around shaft 20 as it rotates. Particularly troublesome are such materials which wrap around shaft 20 between end plates 38, 40 and the sides of housing 14. As these materials accumulate, they exert pressure on the side of bearing assemblies 22, 24 which faces work cavity 19. Such exertion of outward pressure on bearings 22, 24 forces the bearing lubricant from the bearings, which leads to premature failure.

With further reference to FIG. 2, self-aligning bearing assembly 24 includes a hub 60 to which a rotatable bearing member is centrally mounted. The bearing member is adapted to receive shaft 20. The outer face of hub 60 is in the form of a partial sphere. Bearing assembly 24 further includes a housing formed by an inner and an outer flangette. The outer flangette includes a flange 62 having a lip 64 extending therefrom, and the inner flangette includes a flange 66 having a lip 68 extending therefrom. The inner and outer flangettes are adapted for placement in a back-to-back relationship, with lips 64, 68 extending outwardly therefrom. When so positioned, the inner and outer flangettes define a central hub-receiving cavity for retaining hub 60 therein. Lips 64, 68 are formed so as to provide a partial spherical inside surface for receiving the partial spherical outer face of hub 60, thus providing the self-aligning feature of bearing assembly 24.

Flanges 62, 66 have a plurality of openings through which bolts, such as 28, or other satisfactory fasteners extend to connect bearing assembly 24 to side wall 26 of housing 14.

A protective guard for bearing 22 is shown at 70. Guard 70 includes an annular flange portion 72 and a shield portion 74 which is spaced inwardly from flange portion 72. Guard 70 is adapted to be positioned so that flange 72 is disposed between inner flange 66 of bearing assembly 24 and side wall 26 of housing 14. Shield portion 74 extends inwardly through the opening formed in side wall 28 and into work cavity 19 adjacent hammer assembly 18. A gap is provided between shield portion 74 and the inner side of bearing hub 60 to accommodate movement of hub 60 during self-alignment.

Figure 3:
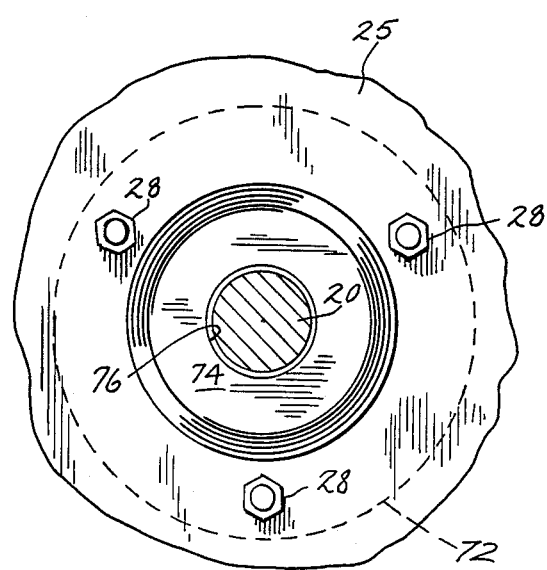
FIG. 3 is a partial sectional view taken generally along line 3—3 of FIG. 2.

As shown in FIG. 3, shield portion 74 of guard 70 includes a substantially central opening 76 for accommodating passage of shaft 20 therethrough. Opening 76 is dimensioned so as to be in relatively close proximity to the outer surfaces of shaft 20. In this manner, entry of fibrous material which accumulates on shaft 20 between end plate 40 of hammer assembly 18 and side wall 26 of work cavity 19 is prevented from contacting the side of bearing 24 which faces work cavity 19. For example, with shaft 20 having a one inch diameter, opening 76 has a diameter of approximately 1.03 inches.

Guard 70 is preferably made of a material such as aluminum. When constructed of such a material, guard 70 can be positioned such that, even if shaft 20 contacts the edge of opening 76 during self-alignment, there will be no adverse affect either on shaft 20 or guard 70. This is because, in most applications, shaft 20 is a hard material such as steel which, when it contacts a material such as aluminum in the described construction, simply wears away the aluminum material of guard 70 in order to accommodate such movement.

Figure 4:
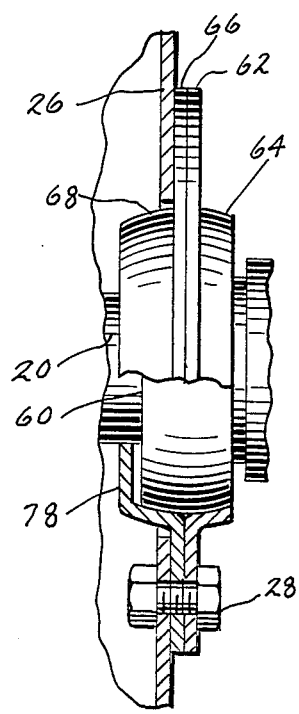
FIG. 4 is a partial sectional view similar to a portion of FIG. 2, showing an alternate embodiment of the protective guard of the invention.

Another embodiment of the invention is shown in FIG. 4. In this embodiment, the inner flangette is again provided with a flange 66 from which a projecting lip 68 extends. A shield surface 78 is integrally formed with lip 68, extending inwardly therefrom toward shaft 20. An opening 80 is provided in shield surface 78 to accommodate passage of shaft 20 therethrough, having substantially the same dimensional tolerances as described above. A gap is provided between shield surface 78 and the inner side of bearing hub 60 to accommodate movement of hub 60 during self-alignment.

Various alternatives and modifications are contemplated as being within the scope of the following claims particularly pointing out and distinctly claiming the invention.

I claim:

1. A bearing assembly, comprising:

a rotatable bearing having a passage for accommodating a rotatable shaft therethrough, said shaft extending into structure defining a work cavity where material comes into contact with and is retained on said shaft;

a hub to which said rotatable bearing is mounted, said hub having a side facing said work cavity;

a housing having a hub cavity for receiving said hub therein said a projecting lip on one side of said housing facing said work cavity for retaining said hub within said hub cavity; and shield means provided adjacent said hub, said shield means being disposed between said work cavity and the side of said hub facing said work cavity, said shield means having an opening adapted to accommodate passage of said shaft therethrough, said opening being located so that said shield means is in relatively close proximity to the outer surface of said shaft so as to resist contact of material retained on said shaft within said work cavity with the side of said hub facing said work cavity; and wherein said shield means extends beyond said projecting lip projecting lip toward said shaft for preventing contact of said material with the side of said hub facing said work cavity; and wherein said shield means comprises a cover member adapted to fit over said projecting lip of said housing, said cover member having a shielding surface extending inwardly toward said shaft and having a substantially central opening for accommodating passage of said shaft therethrough; and wherein said housing includes a pair of flange members adapted for connection to a structural member for mounting said bearing assembly thereto, each said flange member having an opening thererthrough with said projecting lip adjacent said opening so that, when said pair of flange members are positioned in a back-to-back relationship with said projecting lips facing outwardly, said hub cavity is formed for receiving said hub therein, and wherein said cover member includes a flange for connection to said structural member along with said pair of housing flange members.

2. The assembly of claim 1, wherein said cover member is substantially annular, having a substantially central opening for accommodating passage of said shaft therethrough and said shielding surface extending outwardly therefrom, with said cover member flange being disposed adjacent to said shielding surface and extending outwardly therefrom.

3. The assembly of claim 2, wherein said cover member flange is recessed with respect to said shielding surface so as to accommodate said projecting lip of said projecting lip of said flange member.

* * * * *

UNITED STATES PATENT AND TRADEMARK OFFICE
CERTIFICATE OF CORRECTION

PATENT NO. : 4,826,331
DATED : May 2, 1989
INVENTOR(S) : Herbert R. Baker

It is certified that error appears in the above-identified patent and that said Letters Patent is hereby corrected as shown below:

<u>IN THE CLAIMS</u>:

Column 4, Line 24, Claim 1, delete "said" and substitute therefore -- and --; Column 4, Line 37, Claim 1, delete second occurrence of "projecting lip"; Column 4, Line 49, Claim 1, delete "thererthrough" and substitute therefore -- therethrough --.

Signed and Sealed this

Ninth Day of October, 1990

Attest:

HARRY F. MANBECK, JR.

Attesting Officer

Commissioner of Patents and Trademarks